United States Patent (12) United States Patent
Tu et al.

(10) Patent No.: US 11,641,545 B2
(45) Date of Patent: May 2, 2023

(54) CONFERENCE TERMINAL AND FEEDBACK SUPPRESSION METHOD

(71) Applicant: Acer Incorporated, New Taipei (TW)

(72) Inventors: Po-Jen Tu, New Taipei (TW); Jia-Ren Chang, New Taipei (TW); Kai-Meng Tzeng, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 17/475,309

(22) Filed: Sep. 14, 2021

(65) Prior Publication Data

US 2023/0069213 A1 Mar. 2, 2023

(30) Foreign Application Priority Data

Sep. 1, 2021 (TW) ................................ 110132528

(51) Int. Cl.
*H04R 3/00* (2006.01)
*H04R 1/32* (2006.01)
*H04M 3/56* (2006.01)
*H04R 3/02* (2006.01)

(52) U.S. Cl.
CPC ............ *H04R 3/005* (2013.01); *H04M 3/568* (2013.01); *H04R 1/326* (2013.01); *H04R 3/02* (2013.01)

(58) Field of Classification Search
CPC .......... H04R 3/005; H04R 3/02; H04R 1/326; H04M 3/568; G10K 11/17819; G10K 2210/506
USPC ............. 381/71.3, 83, 93, 95, 108, 121, 318
See application file for complete search history.

(56) References Cited

U.S. PATENT DOCUMENTS

| 6,442,280 | B1 | 8/2002 | Ito | |
| 2010/0142327 | A1* | 6/2010 | Kepesi | G10L 25/90 367/124 |
| 2014/0003635 | A1* | 1/2014 | Mohammad | H04R 3/005 381/306 |
| 2016/0157037 | A1 | 6/2016 | Verity et al. | |
| 2021/0006899 | A1* | 1/2021 | Saito | G10L 21/034 |

FOREIGN PATENT DOCUMENTS

| CN | 111128220 | 5/2020 |
| CN | 108370470 | 1/2021 |

* cited by examiner

*Primary Examiner* — William A Jerez Lora
(74) *Attorney, Agent, or Firm* — JCIPRNET (57) ABSTRACT

A conference terminal and a feedback suppression method are provided. In the method, a transmitting sound signal is divided into sub sound signals of multiple frequency bands. Different sub sound signals correspond to different frequency bands. An interfered frequency band corresponding to the howling interference is detected according to the sub sound signals of those frequency bands. The power of the sub sound signal of the interfered frequency band increases along with time. The interfered frequency band is affected by the howling interference. An interference direction is determined according to multiple input sound signals received by the microphone array and merely pass through the interfered frequency band. A sound from the interference direction leads to the howling interference. A beam pattern of the microphone array is determined according to the interference direction. The gain of the beam pattern in the interference direction is reduced.

14 Claims, 5 Drawing Sheets

CONFERENCE TERMINAL AND FEEDBACK SUPPRESSION METHOD

CROSS-REFERENCE TO RELATED APPLICATION

This application claims the priority benefit of Taiwan application serial no. 110132528, filed on Sep. 1, 2021. The entirety of the above-mentioned patent application is hereby incorporated by reference herein and made a part of this specification.

BACKGROUND

Field of the Disclosure

The disclosure relates to a voice conference, and particularly relates to a conference terminal and a feedback suppression method.

Description of Related Art

Remote conferences allow people in different locations or spaces to have conversations, and conference-related equipment, protocols, and applications have also developed well. When a multi-person conference call is in progress, if there are more than two mobile devices operating together in the same space, the speakers may generate a howling that causes interference and discomfort.

Figure 1:
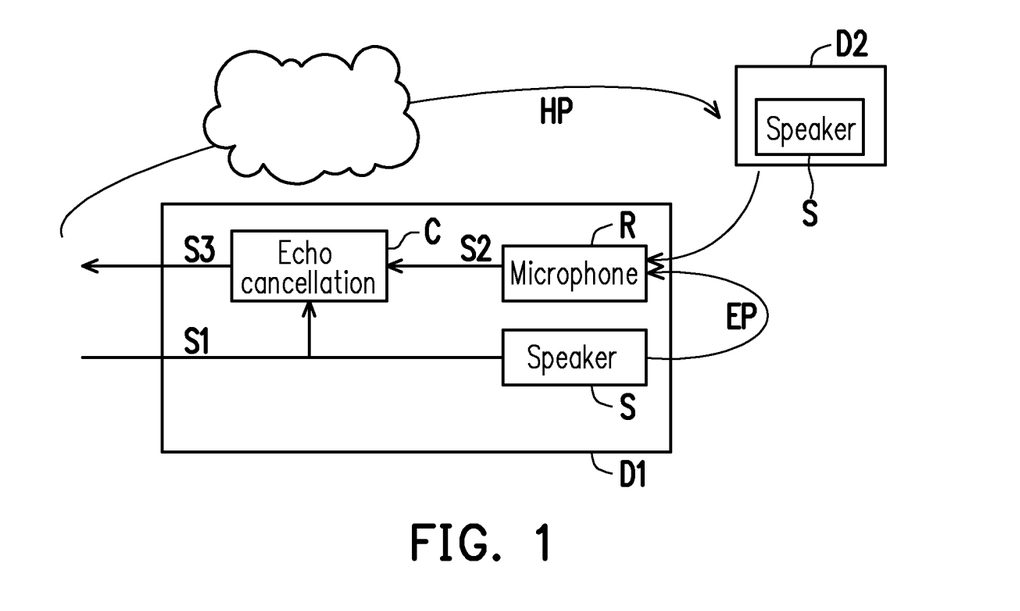
FIG. 1 is a schematic diagram of a conventional sound processing framework.

For example, FIG. 1 is a schematic diagram of a conventional sound processing framework. Please refer to FIG. 1, the sound signal S1 of the mobile device D1 is played through the speaker S. The sound signal S2 received by the microphone R can use the echo cancellation mechanism C to cancel the echo component that passes through the echo path EP and belongs to the sound signal S1, thereby generating the sound signal S3. The sound signal S3 is transmitted to the mobile device D2 through the network and can be played through its speaker S. However, if the sound played by the mobile device D2 is received by the microphone R of the mobile device D1, a closed loop system (for example, the howling path HP) is formed, and a howling that causes interference and discomfort is more likely to be generated.

Figure 2:
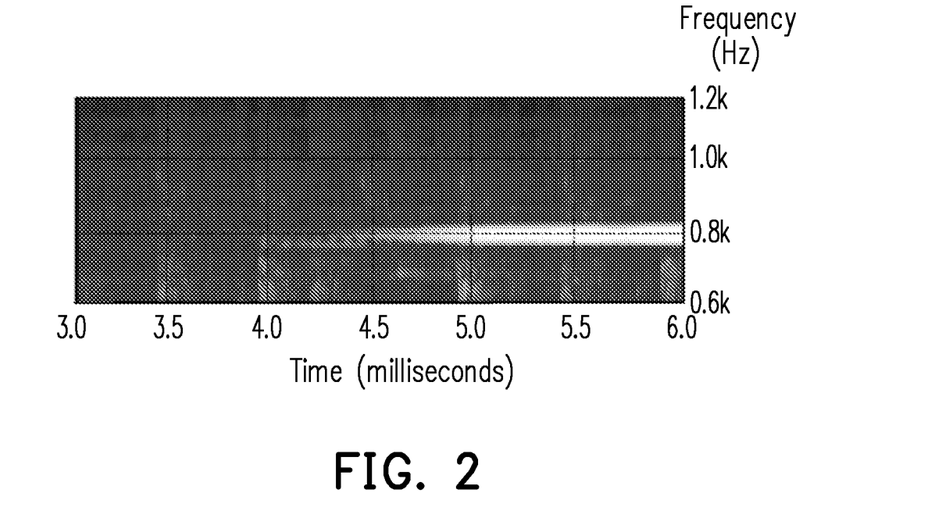
FIG. 2 is an example describing a time-frequency diagram of a howling.

FIG. 2 is an example describing a time-frequency diagram of a howling. Please refer to FIG. 2, the howling is about 0.8 kilohertz (kHz) and becomes louder along with increase of time length. It should be noted that the current suppression technologies for howling are performed to eliminate sound signals of specific frequencies. However, the signal of a specific frequency in the main sound signal that was originally intended to be retained is also eliminated, resulting in distortion of the sound and auditory perception.

SUMMARY OF THE DISCLOSURE

In view of the above problem, the embodiments of the disclosure provide a conference terminal and a feedback suppression method, which can eliminate howling and retain signals of all frequency bands in the main sound signal.

The feedback suppression method of the embodiment of the disclosure is suitable for conference terminals. This conference terminal includes a microphone array and a speaker. The feedback suppression method includes (but is not limited to) the following steps: dividing the transmitted sound signal into sub sound signals of multiple frequency bands; the transmitted sound signal is transmitted through the network; different sub sound signals correspond to different frequency bands; detecting the interfered frequency band corresponding to howling interference according to the sub sound signals of the multiple frequency bands; the power of the sub sound signal of the interfered frequency band among the multiple frequency bands increases along with time; the interfered frequency band is affected by the howling interference; determining an interference direction according to multiple input sound signals received by the microphone array and merely pass through the interfered frequency band; a sound from the interference direction leads to the howling interference; determining a beam pattern of the microphone array according to the interference direction; and the gain of the beam pattern in the interference direction is reduced.

The conference terminal of the embodiment of the disclosure includes (but is not limited to) a microphone array, a speaker, a communication transceiver, and a processor. The microphone array is configured for sound collection. The speaker is configured to play sound. The communication transceiver is configured to transmit or receive data. The processor is coupled to the microphone array, the speaker, and the communication transceiver. The processor is configured to divide the transmitted sound signal into sub sound signals of multiple frequency bands, detect the interfered frequency band corresponding to howling interference according to the sub sound signals of the multiple frequency bands, determine an interference direction according to multiple input sound signals received by the microphone array and merely pass through the interfered frequency band, and determine a beam pattern of the microphone array according to the interference direction. The transmitted sound signal is transmitted through the network through the communication transceiver. Different sub sound signals correspond to different frequency bands. The power of the sub sound signal of the interfered frequency band among these frequency bands increases along with time. The interfered frequency band is affected by howling interference. A sound from the interference direction leads to the howling interference. The gain of the beam pattern in the interference direction is reduced.

Based on the above, according to the conference terminal and feedback suppression method of the embodiment of the disclosure, the sub sound signal whose power increases along with time and its corresponding interfered frequency band are detected among multiple frequency bands, the interference direction leading to the howling interference is determined through the microphone array, and the gain of the interference direction is suppressed through beamforming. In this way, all frequency bands in the main voice signal can be retained, and howling can also be suppressed.

In order to make the above-mentioned features and advantages of the disclosure more comprehensible, the following specific embodiments are described in detail in conjunction with the accompanying drawings.

DESCRIPTION OF EMBODIMENTS

Figure 3:
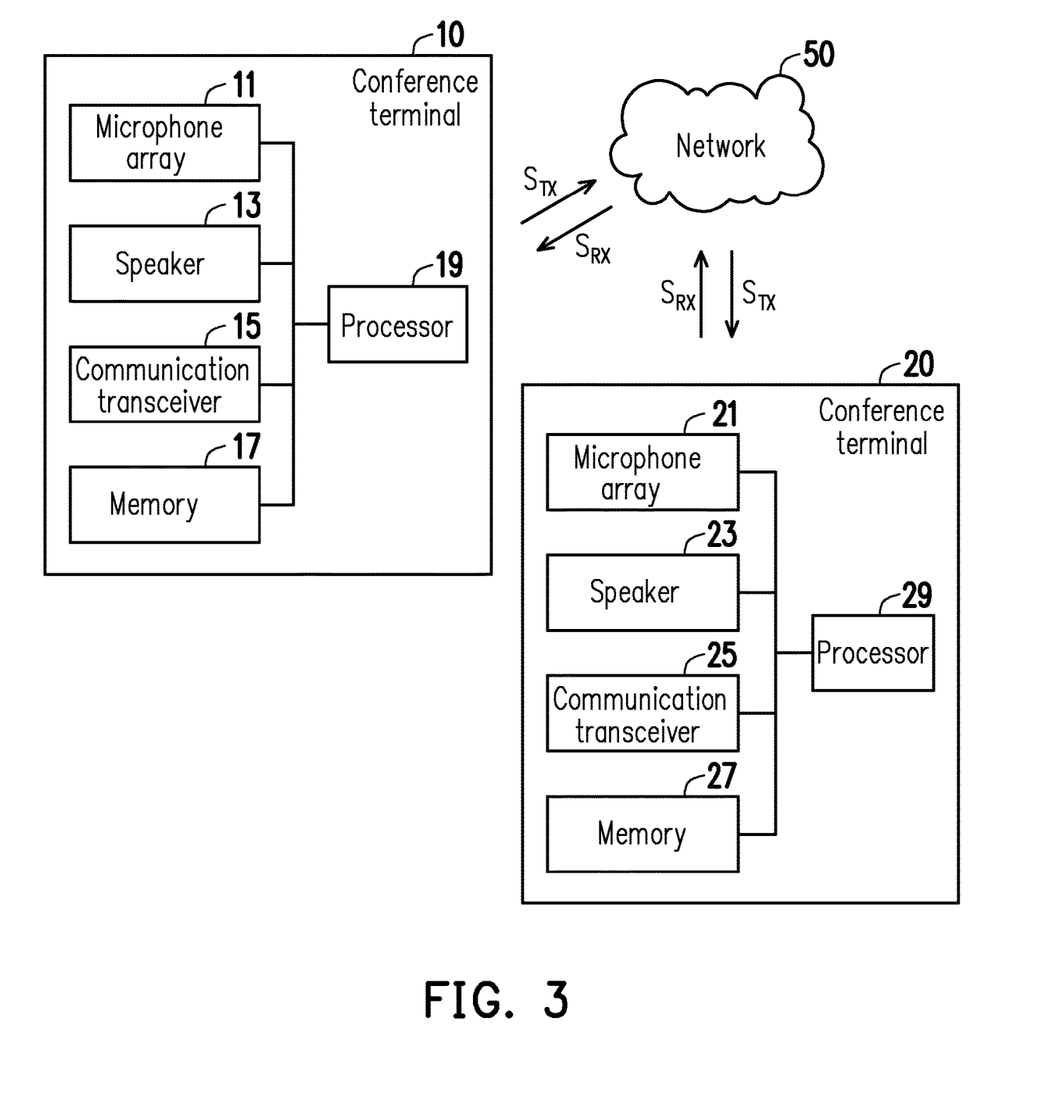
FIG. 3 is a schematic diagram of a conference call system according to an embodiment of the disclosure.

FIG. 3 is a schematic diagram of a conference call system 1 according to an embodiment of the disclosure. The conference call system 1 includes (but is not limited to) conference terminals 10 and 20 and a cloud server 50.

The conference terminals 10 and 20 may be wired phones, mobile phones, Internet phones, tablet computers, desktop computers, notebook computers, or smart speakers.

The conference terminal 10 includes (but is not limited to) a microphone array 11, a speaker 13, a communication transceiver 15, a memory 17, and a processor 19.

The microphone array 11 includes multiple microphones of dynamic type, condenser type, or electret condenser type. The microphone array 11 may also include a combination of other electronic components, analog-to-digital converters, filters, and audio processors that can receive sound waves (for example, human voice, ambient sound, machine operation sound, etc.) and convert them into sound signals. In an embodiment, the microphone array 11 is configured to collect/record the voice of the speaker to obtain the input sound signal. In some embodiments, the input sound signal may include the voice of the speaker, the sound generated by the speakers 13 and 23, and/or other ambient sounds.

The speaker 13 may be a speaker or a loudspeaker. In an embodiment, the speaker 13 is configured to play sound.

The communication transceiver 15 is, for example, a transceiver (which may include, but not limited to, connection interface, signal converters, communication protocol processing chips and other components) that supports wired networks such as Ethernet, optical fiber networks, or cables. The transceiver may also be a transceiver (which may include, but are not limited to, antennas, digital-to-analog/analog-to-digital converters, communication protocol processing chips and other components) that supports Wi-Fi, fourth-generation (4G), fifth-generation (5G) or later generation mobile networks and other wireless networks. In an embodiment, the communication transceiver 15 is configured to transmit or receive data through a network 50 (for example, the Internet, a local area network, or other types of networks).

The memory 17 can be any type of fixed or removable random access memory (RAM), read only memory (ROM), flash memory, hard disk drive (HDD), solid-state drive (SSD) or similar components. In an embodiment, the memory 17 is configured to store program codes, software modules, configuration, data (for example, sound signal, interfered frequency band, interference direction, or beam pattern) or files.

The processor 19 is coupled to the microphone array 11, the speaker 13, the communication transceiver 15 and the memory 17. The processor 19 may be a central processing unit (CPU), a graphic processing unit (GPU), or other programmable general-purpose or special-purpose microprocessors, digital signal processor (DSP), programmable controller, field programmable gate array (FPGA), application-specific integrated circuit (ASIC) or other similar components or a combination of the above components. In an embodiment, the processor 19 is configured to perform all or part of the operations of the conference terminal 10 to which it belongs, and can load and execute various software modules, files, and data stored in the memory 17.

The conference terminal 20 includes (but is not limited to) a microphone array 21, a speaker 23, a communication transceiver 25, a memory 27, and a processor 29. The implementation and functions of the microphone array 21, the speaker 23, the communication transceiver 25, the memory 27, and the processor 29 can be derived from the description of the microphone array 11, the speaker 13, the communication transceiver 15, the memory 17 and the processor 19, and no further description is incorporated herein. The processor 29 is configured to perform all or part of the operations of the conference terminal 20 to which it belongs, and can load and execute various software modules, files, and data stored in the memory 27.

Hereinafter, various devices, components, and modules in the conference communication system 1 will be incorporated to describe the method in the embodiment of the disclosure. Each process of the method can be adjusted according to the actual implementation, and is not limited thereto.

In addition, it should be noted that, for the convenience of description, the same component can achieve the same or similar operations, and no further description will be incorporated herein. For example, the processor 19 of the conference terminal 10 and the processor 19 of the conference terminal 20 can both implement the same or similar method in the embodiment of the disclosure.

Figure 4:
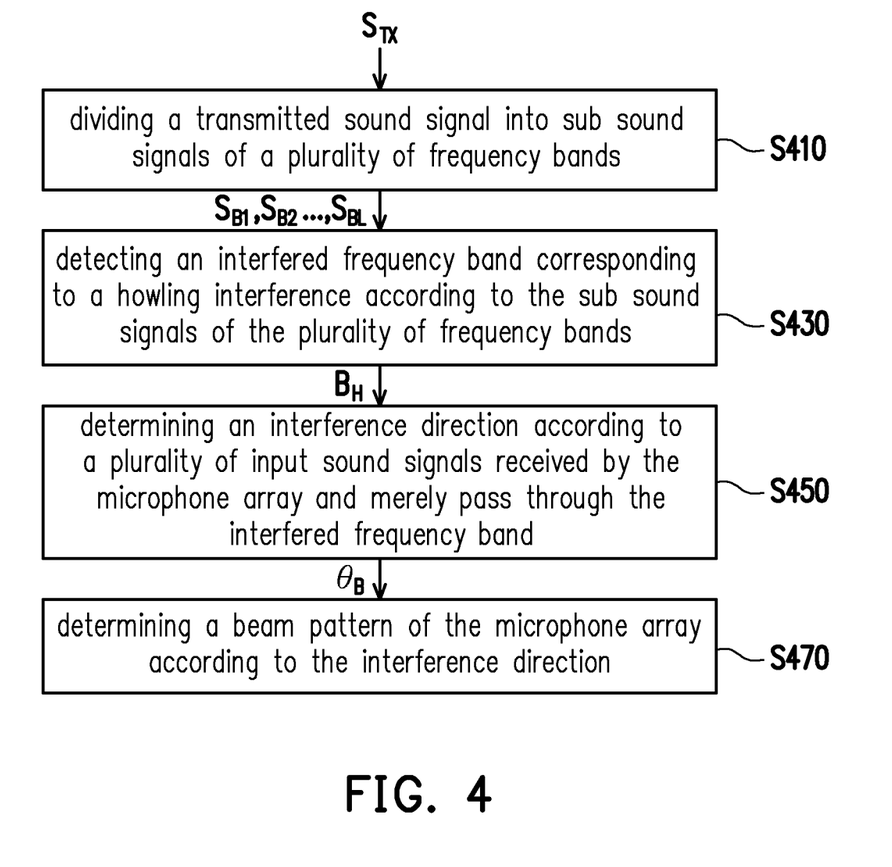
FIG. 4 is a flowchart of a feedback suppression method according to an embodiment of the disclosure.

FIG. 4 is a flowchart of a feedback suppression method according to an embodiment of the disclosure. Referring to FIG. 4, the processor 19 of the conference terminal 10 may divide the transmitted sound signal $S_{TX}$ into sub sound signals $S_{B1}, S_{B2}, \ldots, S_{BL}$ (L is a positive integer) of multiple frequency bands B1, B2, ..., BL (step S410). Specifically, transmitting the sound signal $S_{TX}$ is performed by transmitting the sound signal Six to the conference terminal 20 through the communication transceiver 15 via the network 50. Generally speaking, the processor 19 can perform sound processing such as filtering, echo cancellation, and gain adjustment on the input sound signals $S_{M1}$ to $S_{MN}$ recorded by the microphone array 11, and generate the transmitted sound signal Six accordingly. In an embodiment, the processor 19 may divide the transmitted sound signal Six into sub sound signals $S_{B1}$~$S_{BL}$ of L (for example, 64, 128, or 512) frequency bands B1~BL through Fourier transform, wavelet transform, or impulse response. Different sub sound signals $S_{B1}$~$S_{BL}$ correspond to different frequency bands B1~BL. For example, the sub sound signal $S_{B1}$ only covers the frequency band B1 ranging from 600 Hz to 700 Hz, and the sub sound signal $S_{B2}$ only covers the frequency band B2 ranging from 700 Hz to 800 Hz.

The processor 19 can detect the interfered frequency band $B_H$ corresponding to the howling interference according to the sub sound signals $S_{B1}$ to $S_{BL}$ of the frequency bands B1 to BL (step S430). Specifically, the howling interference is characterized in that the sound signal of a certain frequency becomes louder and louder along with the increase of time length. It can be obtained that if one or more of the interfered frequency bands $B_H$ among the frequency bands is affected by howling interference, the power of the sub sound signal of the interfered frequency band $B_H$ increases along with time.

In an embodiment, the processor 19 may determine the interfered frequency band according to the power change and the single frequency ratio. The power change is related to the difference or the amount of change in the power of the sub sound signal of the interfered frequency band at different time points, such as the highest, average or other statistically measured power difference of the interfered frequency band between time point t−1 and time point t. The greater the power change, the greater the probability that frequency band is affected by howling interference. On the other hand, if the power change is smaller, the probability that frequency band is affected by howling interference is smaller. In addition, the single frequency ratio is the proportion that the power of the sub sound signal of the interfered frequency band accounts for in all or part of the sub sound signals $S_{B1}$~$S_{BL}$. If the single frequency ratio is greater, the probability that frequency band is affected by howling interference is greater. On the other hand, if the ratio of single frequency is smaller, the probability that frequency band is affected by howling interference is smaller.

In an embodiment, the processor 19 may determine that the product of the power change of the interfered frequency band and the single frequency ratio is greater than a threshold value. Assuming that the power corresponding to the sub sound signals $S_{B1}$~$S_{BL}$ of each frequency band B1~BL at time t is $P_t^1, P_t^2, \ldots, P_t^L$, respectively, then the possibility that the frequency band Bb (b is a value from 1 to L) is an interfered frequency band $B_H$ is:

$$F_t^b = \left(\frac{P_t^b - P_{t-1}^b}{P_t^b + P_{t-1}^b}\right) \times \frac{P_t^b}{\sum_{b=1}^{N_B} P_t^b} \quad (1)$$

The left half $$\left(\frac{P_t^b - P_{t-1}^b}{P_t^b + P_{t-1}^b}\right)$$

reflects the influence of power change over time (i.e., the aforementioned power change). If the power of frequency band Bb is increased over time, this value (which is between −1 and 1) will get closer and closer to 1. On the other hand, the right half $$\left(\frac{P_t^b}{\sum_{b=1}^{N_B} P_t^b}\right)$$

reflects the proportion (which is between 0 and 1) that the power of the frequency band Bb accounts for the power of the overall sub sound signals $S_{B1}$~$S_{BL}$ (i.e., the aforementioned single frequency ratio). Therefore, if the sub sound signal $S_{Bb}$ of the frequency band Bb becomes louder and louder, the value of the possibility $F_t^b$ (that is, the product of the power change and the single frequency ratio) will become larger and larger. In addition, if the possibility $F_t^b$ exceeds the defined threshold value $T_H$ (for example, 0.5, 0.4 or 0.45), it is very likely that howling interference will occur at this frequency band Bb. On the other hand, if the possibility $F_t^b$ does not exceed the threshold value $T_H$, the processor 19 may determine that no howling interference occurs at this frequency band Bb. The formula (2) for determining the detection of howling interference at time point t can be defined as:

$$\begin{cases} \max_{b \in B} F_t^b \geq T_H, & \text{howling inteference occurs} \\ \text{Others}, & \text{howling interference does no occur} \end{cases} \quad (2)$$

In light of the above, it can be obtained that when howling interference occurs, the frequency band with the highest possibility, the second highest possibility or the possibility that is higher than the threshold value is the interfered frequency band $B_H$.

It should be noted that the number of interfered frequency bands $B_H$ at the same time point is not limited to one. As long as the detection conditions are met (for example, the possibility or power change exceeds the corresponding threshold value), the frequency band can be regarded as the interfered frequency band $B_H$.

Figure 5:
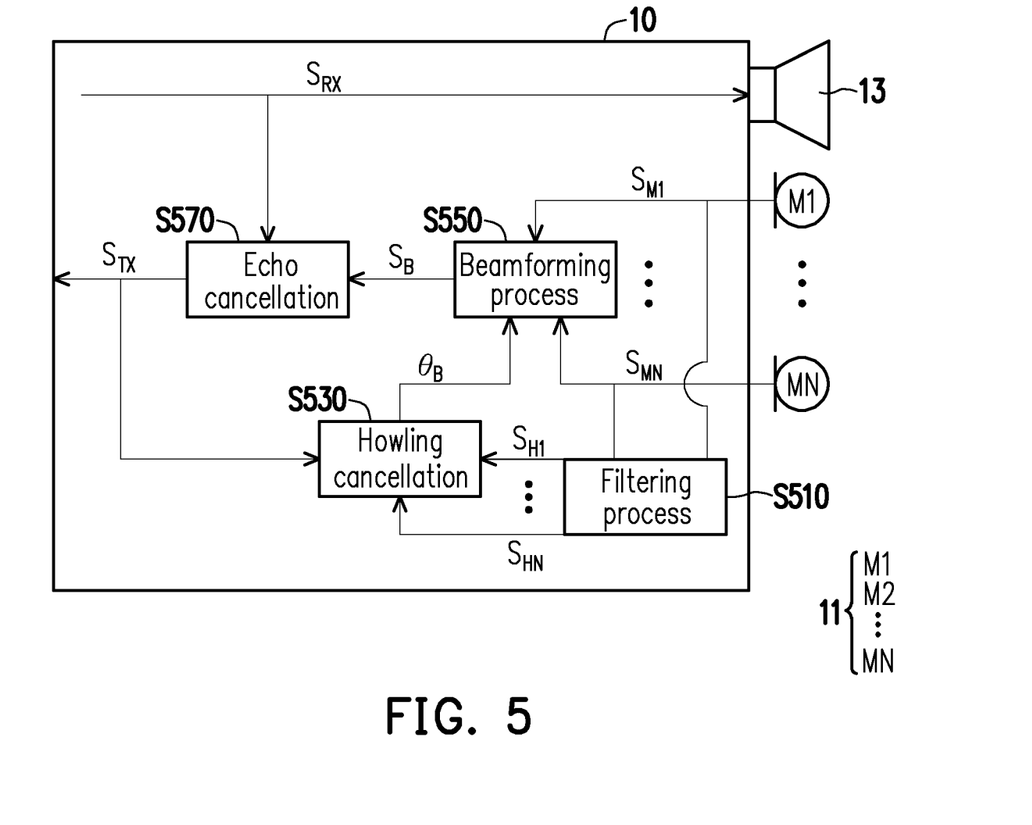
FIG. 5 is a schematic diagram showing feedback suppression according to an embodiment of the disclosure.

The processor 19 may determine the interference direction OB according to the multiple input sound signals $S_{M1}$~$S_{MN}$ received by the microphone array 11 and merely pass through the interfered frequency band $B_H$ (step S450). Specifically, FIG. 5 is a schematic diagram showing feedback suppression according to an embodiment of the disclosure. Referring to FIG. 5, it is assumed that the microphone array 11 includes N microphones M1~MN (N is a positive integer greater than 1). The sound signals obtained by recording sounds through the microphones M1~MN are the input sound signals $S_{M1}$~$S_{MN}$, respectively. Assume that the conference terminals 10 and 20 establish a conference call. For example, the conference is established through video software, voice call software, or making a phone call, the caller can start talking. After recording/receiving sounds through the microphones M1~MN, the processor 19 can obtain the input sound signals $S_{M1}$~$S_{MN}$.

The processor 19 may perform filtering processing on the input sound signals $S_{M1}$~$S_{MN}$ respectively (step S510). Specifically, this filtering process, for example, allows only signals of the interfered frequency band $B_H$ to pass through, and blocks signals of other frequency bands that are not the interfered frequency band $B_H$ from passing through. In an embodiment, the processor 19 can divide the input sound signals $S_{M1}$~$S_{MN}$ into L frequency bands B1~BL respectively through Fourier transform, wavelet transform, or impulse response, and extract only the input sound signals $S_{H1}$~$S_{HN}$ that belong to the interfered frequency band $B_H$. In another embodiment, a bandpass filter can be set according to the interfered frequency band $B_H$, and the processor 19 filters the input sound signals $S_{M1}$~$S_{MN}$ respectively through the bandpass filter to obtain the input sound signals $S_{H1}$~$S_{HN}$.

In an embodiment, the processor 19 determines the time difference Δt between the input sound signals $S_{H1}$~$S_{HN}$ according to the correlation between the input sound signals $S_{H1}$~$S_{HN}$. Here, the correlation referred to corresponds to the phase/time delay between two of the input sound signals $S_{H1}$~$S_{HN}$. Taking two microphones M1 and M2 as an example, the processor 19 uses cross-correlation or other correlation algorithms on the input sound signals $S_{H1}$ and $S_{H2}$ to obtain the correlation. Each correlation corresponds to a phase/time delay, and the processor 19 can obtain a time difference Δt based on the phase/time delay.

It should be noted that the sound from the interference direction $\theta_B$ causes howling interference. For example, the conference terminal 20 is located at the interference direction $\theta_B$ of the conference terminal 10. The processor 19 can determine the interference direction $\theta_B$ according to the distance between the time difference Δt and the multiple microphones M1~MN in the microphone array 11. That is, the distance traveled by the sound over the time difference Δt is the adjacent side of the interference direction $\theta_B$ in the right triangle, and the distance between the two microphones is the hypotenuse of the interference direction $\theta_B$. Taking two microphones M1 and M2 as an example, the distance between the two microphones is d, and the interference direction $\theta_B$ is:

$$\theta_B \cong \cos^{-1}\left(\frac{\Delta t \cdot v_S}{d}\right) \quad (3)$$

$v_s$ is the speed of sound propagation.

In other embodiments, the processor 19 may also obtain the interference direction $\theta_B$ through other sound source positioning algorithms.

Referring to FIG. 4, the processor 19 may determine the beam pattern of the microphone array 11 according to the interference direction $\theta_B$ (step S470). Specifically, the beamforming technology adjusts the parameters (for example, phase and amplitude) of the basic unit of the phased array, so that signals at certain angles obtain constructive interference, and signals at other angles obtain destructive interference. Therefore, different parameters will form different beam patterns.

Referring to FIG. 5, if howling interference is detected, the processor 19 performs howling cancellation according to the interference direction $\theta_B$ corresponding to the howling interference (step S530). The processor 19 may determine the beamforming parameters according to the interference direction $\theta_B$ (step S550), and reduce the gain of the beam pattern at the interference direction $\theta_B$.

In an embodiment, the processor 19 aligns the null steering of the beam pattern with the interference direction $\theta_B$. In another embodiment, the processor 19 aligns the position between the main lobe and sidelobe in the beam pattern with the interference direction $\theta_B$.

In an embodiment, the memory 17 records the corresponding relationship between beamforming parameters (for example, the amplitude and phase corresponding to different microphones M1 to MN) and various interference directions $\theta_B$, and the corresponding relationship is recorded for the processor 19 to use. For example, when the interference direction $\theta_B$ is 30 degrees, the null steering in this beam pattern is towards 30 degrees. In another embodiment, the processor 19 may use a model based on a machine learning algorithm to infer an appropriate beam pattern of the interference direction $\theta_B$, and generate corresponding parameters accordingly.

The processor 19 may generate an input sound signal SB according to the beamforming parameters. Under the circumstances, the input sound signal SB still retains signals of all frequency bands.

In an embodiment, even if no howling interference is detected, the processor 19 can still aim the main beam or main lobe at the speaker of the conference terminal 10 based on the beamforming technology.

Figure 6A:
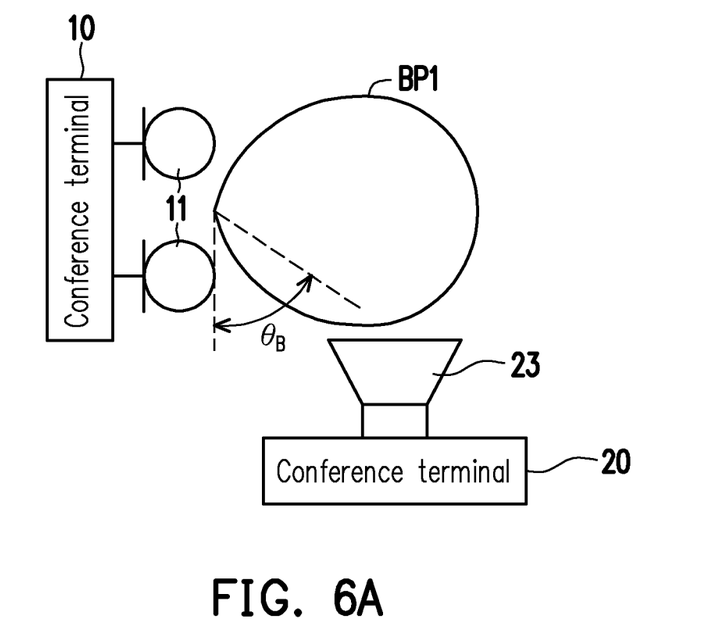
FIG. 6A is a schematic diagram showing a beam pattern according to an embodiment of the disclosure.

For example, FIG. 6A is a schematic diagram showing a beam pattern PB1 according to an embodiment of the disclosure. Please refer to FIG. 6A. Assuming that no howling interference is detected, the beam pattern PB1 faces forward, and receives the sound signal at the front accordingly.

Figure 6B:
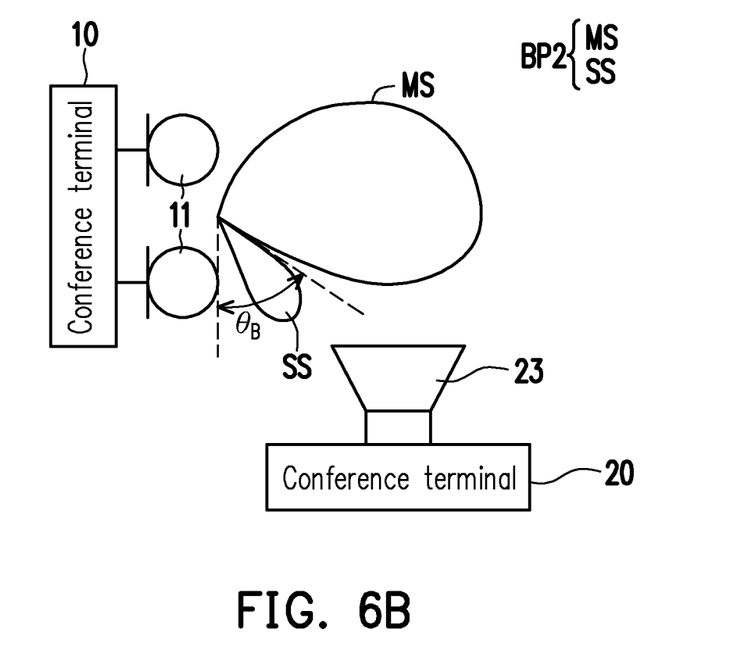
FIG. 6B is a schematic diagram showing a beam pattern according to an embodiment of the disclosure.

FIG. 6B is a schematic diagram showing a beam pattern PB2 according to an embodiment of the disclosure. Please refer to FIG. 6B, the beam pattern PB2 includes a main lobe MS and a sidelobe SS. The conference terminal 20 is located at the interference direction $\theta_B$ of the conference terminal 10. The interference direction $\theta_B$ is substantially located at null steering between the main lobe MS and the sidelobe SS.

On the other hand, referring to FIG. 5, the processor 19 can still perform echo cancellation on the input sound signal SB subjected to beamforming process according to the received sound signal $S_{Rx}$ (the sound signal to be played through the speaker 13 thereof) in the call (step S570).

In summary, in the conference terminal and feedback suppression method in the embodiment of the disclosure, the microphone array technology is adopted to determine the interference direction corresponding to the howling interference, and cancel the howling interference based on beamforming technology. In this way, the howling of a specific frequency can be canceled, and all frequency bands of the input sound signals can be retained.

Although the present disclosure has been disclosed in the above embodiments, it is not intended to limit the present disclosure, and those skilled in the art can make some modifications and refinements without departing from the spirit and scope of the disclosure. Therefore, the scope of the present disclosure is subject to the definition of the scope of the appended claims.

What is claimed is:

1. A feedback suppression method, suitable for a conference terminal, wherein the conference terminal comprises a microphone array and a speaker, and the feedback suppression method comprises:
   dividing a transmitted sound signal into sub sound signals of a plurality of frequency bands, wherein the transmitted sound signal is transmitted via a network, and the different sub sound signals correspond to the plurality of different frequency bands;
   detecting an interfered frequency band corresponding to a howling interference according to the sub sound signals of the plurality of frequency bands, wherein a power of the sub sound signal of the interfered frequency band among the plurality of frequency bands increases along with time, and the interfered frequency band is affected by the howling interference, and detecting the interfered frequency band corresponding to the howling interference according to the sub sound signals of the frequency bands comprises:
   determining the interfered frequency band according to a power change and a single frequency ratio, wherein the power change is related to a difference in a power of the sub sound signal of the interfered frequency band at different time points, and the single frequency ratio is a proportion that the power of the sub sound signal of the interfered frequency band accounts for in the sub sound signals;
   determining an interference direction according to a plurality of input sound signals received by the microphone array and merely pass through the interfered frequency band, wherein a sound from the interference direction leads to the howling interference; and
   determining a beam pattern of the microphone array according to the interference direction, wherein a gain of the beam pattern in the interference direction is reduced.

2. The feedback suppression method according to claim 1, wherein determining the interfered frequency band according to the power change and the single frequency ratio comprises:
   determining that a product of the power change and the single frequency ratio is greater than a threshold value.

3. The feedback suppression method according to claim 1, wherein determining the interference direction according to the plurality of input sound signals received by the microphone array and merely pass through the interfered frequency band comprises:

determining a time difference between the plurality of input sound signals according to a correlation between the plurality of input sound signals; and     determining the interference direction according to the time difference and a distance between a plurality of microphones in the microphone array.

4. The feedback suppression method according to claim 1, wherein determining the beam pattern of the microphone array according to the interference direction comprises:

aligning a null steering of the beam pattern with the interference direction.

5. The feedback suppression method according to claim 1, wherein determining the interfered frequency band according to the power change and the single frequency ratio comprises:

determining a probability that one of the frequency bands is affected by the howling interference is greater, in response to the power change being greater.

6. The feedback suppression method according to claim 1, wherein determining the interfered frequency band according to the power change and the single frequency ratio comprises:

determining a probability that one of the frequency bands is affected by the howling interference is greater, in response to the single frequency ratio being greater.

7. The feedback suppression method according to claim 3, wherein a distance traveled by a sound over the time difference is an adjacent side of the interference direction in a right triangle, and a distance between two of the plurality of microphones is the hypotenuse of the interference direction in the right triangle.

8. A conference terminal, comprising:

a microphone array for receiving a sound;

a speaker for playing the sound;

a communication transceiver for transmitting or receiving data; and     a processor coupled to the microphone array, the speaker and the communication transceiver, and is configured to:

divide a transmitted sound signal into sub sound signals of a plurality of frequency bands, wherein the transmitted sound signal is transmitted via a network through the communication transceiver, and the different sub sound signals correspond to the plurality of different frequency bands;

detect an interfered frequency band corresponding to a howling interference according to the sub sound signals of the plurality of frequency bands, wherein a power of the sub sound signal of the interfered frequency band among the plurality of frequency bands increases along with time, and the interfered frequency band is affected by the howling interference, and the processor is further configured to:

determine the interfered frequency band according to a power change and a single frequency ratio, wherein the power change is related to a difference in a power of the sub sound signal of the interfered frequency band at different time points, and the single frequency ratio is a proportion that the power of the sub sound signal of the interfered frequency band accounts for in the sub sound signals;

determine an interference direction according to a plurality of input sound signals received by the microphone array and merely pass through the interfered frequency band, wherein a sound from the interference direction leads to the howling interference; and         determine a beam pattern of the microphone array according to the interference direction, wherein a gain of the beam pattern in the interference direction is reduced.

9. The conference terminal according to claim 8, wherein the processor is further configured to:

determine that a product of the power change and the single frequency ratio is greater than a threshold value.

10. The conference terminal according to claim 8, wherein the processor is further configured to:

determine a time difference between the plurality of input sound signals according to a correlation between the plurality of input sound signals; and     determine the interference direction according to the time difference and a distance between a plurality of microphones in the microphone array.

11. The conference terminal according to claim 8, wherein the processor is further configured to:

align a null steering of the beam pattern with the interference direction.

12. The conference terminal according to claim 8, wherein the processor is further configured to:

determine a probability that one of the frequency bands is affected by the howling interference is greater, in response to the power change being greater.

13. The conference terminal according to claim 8, wherein the processor is further configured to:

determine a probability that one of the frequency bands is affected by the howling interference is greater, in response to the single frequency ratio being greater.

14. The conference terminal according to claim 10, wherein a distance traveled by a sound over the time difference is an adjacent side of the interference direction in a right triangle, and a distance between two of the plurality of microphones is the hypotenuse of the interference direction in the right triangle.

\* \* \* \* \*